(12) United States Patent
Ng et al.

(10) Patent No.: US 12,149,965 B2
(45) Date of Patent: Nov. 19, 2024

(54) TESTING A BASE STATION

(71) Applicant: Nokia Technologies Oy, Espoo (FI)

(72) Inventors: Man Hung Ng, Swindon (GB); Bartlomiej Golebiowski, Olesnica (PL); Tomasz Wojciechowski, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/702,745

(22) PCT Filed: Sep. 13, 2022

(86) PCT No.: PCT/EP2022/075399
§ 371 (c)(1),
(2) Date: Apr. 18, 2024

(87) PCT Pub. No.: WO2023/078601
PCT Pub. Date: May 11, 2023

(65) Prior Publication Data
US 2024/0334214 A1    Oct. 3, 2024

(30) Foreign Application Priority Data
Nov. 2, 2021  (FI) .................................. 20216130

(51) Int. Cl.
*H04W 24/00*        (2009.01)
*H04L 5/00*         (2006.01)
(Continued)

(52) U.S. Cl.
CPC ........... *H04W 24/06* (2013.01); *H04L 5/0005* (2013.01); *H04L 27/2666* (2013.01); *H04W 56/00* (2013.01)

(58) Field of Classification Search
CPC .... H04W 24/06; H04W 56/00; H04L 5/0005; H04L 27/2666
See application file for complete search history.

(56) References Cited

U.S. PATENT DOCUMENTS

| | | | |
|---|---|---|---|
| 2013/0279376 A1* | 10/2013 | Ahmadi | H04W 72/04 370/329 |
| 2019/0037427 A1* | 1/2019 | Yerramalli | H04W 72/04 |
| 2019/0173593 A1* | 6/2019 | Chapman | H04B 17/12 |

OTHER PUBLICATIONS

"3rd Generation Partnership Project; Technical Specification Group Radio Access Network; NR, E-UTRA, UTRA and GSM/EDGE; Multi-Standard Radio (MSR) Base Station (BS) conformance testing (Release 16)", 3GPP Draft; 37141-GB0, 3rd Generation Partnership Project (3GPP), Mobile Competence Centre ; 650, Route Des Lucioles ; F-06921 Sophia-Antipolis Cedex; France Oct. 1, 2021 (Oct. 1, 2021), XP052057311, Retrieved from the Internet: URL:https://ftp.3gpp.org/3guinternal/3GPP.
(Continued)

*Primary Examiner* — Khai M Nguyen
(74) *Attorney, Agent, or Firm* — Robert P. Michal, Esq.; Carter, DeLuca & Farrell LLP (57) ABSTRACT

Methods and apparatus for base station conformance testing are disclosed. Two wireless carriers that are based on different radio technologies and dynamically share a radio spectrum are received from a base station. Frequencies and timings of the two wireless carriers are measured and a frequency difference between the measured frequencies and a timing difference between the measured timings of the two wireless carriers are then determined. It can then be determined whether the frequency and timing differences satisfy predefined criteria for acceptable frequency and timing differences.

20 Claims, 4 Drawing Sheets

(51) Int. Cl.
*H04L 27/26* (2006.01)
*H04W 24/06* (2009.01)
*H04W 56/00* (2009.01)

(56) References Cited

OTHER PUBLICATIONS

"3rd Generation Partnership Project; Technical Specification Group Radio Access Network; NR; Base Station (BS) conformance testing Part 2: Radiated conformance testing (Release 16)", 3GPP Draft; 38141-2-G90, 3rd Generation Partnership Project (3GPP), Mobile Competence Centre; 650, Route Des Lucioles; F-06921 Sophia-Antipolis Cedex; France Oct. 1, 2021 (Oct. 1, 2021), XP052057341, Retrieved from the Internet: URL:https://ftp.3gpp.org/3guinternal/3GPP_ ultimate_versions_to_be_transposed/sentToD.

Ericsson et al: "Introduction of NR to 37.145-2", 3GPP Draft; 37145-2_CR0067R1_(REL-15)_R4-1816475, 3rd Generation Partnership Project (3GPP), Mobile Competence Centre; 650, Route Des Lucioles; F-06921 Sophia-Antipolis Cedex; France vol. RAN WG4, no. Spokane, USA; Nov. 12, 2018-Nov. 16, 2018 Dec. 9, 2018 (Dec. 9, 2018), XP051552599, Retrieved from the Internet: URL:http://www.3gpp.org/ftp/Meetings%5F3GPP%5FSYNC/RAN/Docs/RP%2D182362%2Ezip [retrieved on Dec. 9, 2018] abstract.

"3rd Generation Partnership Project; Technical Specification Group Radio Access Network; NR; Integrated Access and Backhaul (IAB) conformance testing; Part 2: Radiated conformance testing; (Release 16)", 3GPP Draft; RP-211312, 3rd Generation Partnership Project (3GPP), Mobile Competence Centre; 650, Route Des Lucioles; F-06921 Sophia-Antipolis Cedex; France Jun. 7, 2021 (Jun. 7, 2021), XP052025375, Retrieved from the Internet: URL:https://ftp.3gpp.org/tsg_ran/TSG_RAN/TSGR_92e/Docs/RP-211312.

International Search Report issued by the European Patent Office acting as the International Searching Authority in relation to International Application No. PCT/EP2022/075399 dated Dec. 20, 2022 (4 pages).

Written Opinion of the International Searching Authority issued by the European Patent Office acting as the International Searching Authority in relation to International Application No. PCT/EP2022/075399 dated Dec. 20, 2022 (7 pages).

* cited by examiner

TESTING A BASE STATION

CROSS-REFERENCE TO RELATED APPLICATIONS

This application is a national phase entry under 35 U.S.C. 371 of PCT International Application No. PCT/EP2022/075399 filed Sep. 13, 2022, which claims priority to Finnish Patent Application No. 20216130, filed Nov. 2, 2021, the disclosure of each of these applications is expressly incorporated herein by reference in their entirety.

FIELD

Methods, apparatuses and computer program products for testing a base station are disclosed.

BACKGROUND

Communications may be provided, for example, by means of a communication network and one or more compatible communication devices. A communication device at a network side provides an access node to the system. In mobile or wireless communication systems this node is commonly referred to as a base station. A base station provides appropriate signal receiving and transmitting apparatus for enabling communications with devices serviced by it and provided with appropriate signal receiving and transmitting apparatus.

The communication system and associated devices typically operate in accordance with a given standard or specification which sets out what the various entities associated with the system are permitted to do and how that should be achieved. Communication protocols and/or parameters which shall be used for the connection are also typically defined. For example, 3rd Generation Partnership Project (3GPP) has been standardizing various aspects of the communications system to ensure interoperability of the equipment by various suppliers. A base station can be configured to operate according to a multiple of standards.

A part of setting up and operating a communication system and base stations is testing. A testing arrangement can be configured to determine that the base stations conform with the requirements set by the standard and/or ensuring that the base stations provide satisfactory performance and/or do not cause unacceptable levels of interference.

SUMMARY

In accordance with an aspect there is provided a method for base station conformance testing, comprising receiving from the base station two wireless carriers that are based on different radio technologies and dynamically share a radio spectrum, measuring frequencies and timings of the two wireless carriers, determining a frequency difference between the measured frequencies of the two wireless carriers, determining a timing difference between the measured timings of the two wireless carriers, and determining whether the frequency and timing differences satisfy predefined criteria for acceptable frequency and timing differences.

In accordance with a more specific aspect the method comprises determining difference in the frequencies and/or difference in the timings between the two wireless carriers during error vector magnitude testing. The difference in the frequencies and/or the difference in the timings may be obtained in a Pre-FFT minimization process of the error vector magnitude testing.

Wireless carriers according to 3GPP 5G New Radio and 3GPP 4G Long Term Evolution standards may be tested.

The method may comprise computing a relative carrier frequency error and a relative carrier timing error between the two wireless carriers of different carrier technologies. Different relative carrier frequency and timing error limits may be used for different sub-carrier spacings. The method may comprise applying the strictest of the limits to mixed sub-carrier spacings between the two wireless carriers of different carrier technologies. Absolute differences between the carrier frequency errors and carrier timing errors of the two wireless carriers may be computed.

The method may further comprise setting up communication between a testing device and a base station for conformance testing. The setting up may comprise applying a frequency shift to a wireless carrier generated by the testing device and using the frequency shifted wireless carrier for the setup of the testing device. 7.5 kHz frequency shift may be applied to the wireless carrier. The frequency shift may be applied to a 3GPP 5G New Radio uplink carrier.

The method may comprise adjusting frequency and/or timing of at least one of the wireless carriers based on the testing.

In accordance with another aspect there is provided an apparatus for a testing device for base station conformance testing, comprising at least one processor and at least one memory including a computer program code, the at least one memory and computer program code configured to, with the at least one processor, cause the apparatus to perform at least determining frequency and timing differences between measured frequencies and timings of two wireless carriers received from the base station based on different radio technologies and dynamically sharing a radio spectrum, and determining whether the frequency and timing differences satisfy a predefined criteria for acceptable frequency and timing differences.

The apparatus may be configured to determine the difference in the frequencies and/or the difference in the timings between the two wireless carriers during error vector magnitude testing. The difference in the frequencies and/or the difference in the timings may be determined in a Pre-FFT minimization process of the error vector magnitude testing.

The apparatus may be configured to test wireless carriers according to 3GPP 5G New Radio and 3GPP 4G Long Term Evolution standards.

The apparatus may be configured to compute a relative carrier frequency error and a relative carrier timing error between the two wireless carriers of different carrier technologies. Different relative carrier frequency and timing error limits can be used for different sub-carrier spacings. The strictest limits may be applied to mixed sub-carrier spacings between the two wireless carriers of different carrier technologies. The apparatus may be configured to compute absolute differences between the carrier frequency errors and carrier timing errors of the two wireless carriers.

The apparatus may be further configured to set up communications between the testing device and the base station for the conformance testing. The setting up can comprise applying a frequency shift to a wireless carrier generated by the testing device and using the frequency shifted wireless carrier for the setup. 7.5 kHz frequency shift may be applied to the wireless carrier. The frequency shift may be applied to a 3GPP 5G New Radio uplink carrier.

The apparatus may be further configured to cause adjustment of frequency and/or timing of at least one of the wireless carriers based on the testing. The adjustment may be provided automatically in response to the testing.

Means for implementing the herein disclosed operations and functions can also be provided. The means can comprise appropriately configured hardware and/or software. Examples for the means are described in the detailed description.

A computer software product embodying at least a part of the herein described functions may also be provided. In accordance with an aspect a computer program comprises instructions for performing at least one of the methods described herein.

BRIEF DESCRIPTION OF DRAWINGS

Some aspects will now be described in further detail, by way of example only, with reference to the following examples and accompanying drawings, in which.

DETAILED DESCRIPTION OF EXAMPLES

The following description gives an exemplifying description of some possibilities to practise the invention. Although the specification may refer to "an", "one", or "some" examples or embodiment(s) in several locations of the text, this does not necessarily mean that each reference is made to the same example of embodiment(s), or that a particular feature only applies to a single example or embodiment. Single features of different examples and embodiments may also be combined to provide other embodiments.

Wireless communication systems provide wireless communications to devices connected therein. Typically, an access node such as a base station is provided for enabling the communications. In the following, certain examples will be described with reference to a 3GPP fourth generation (4G) and fifth generation (5G) radio access architectures. However, the embodiments are not necessarily limited to such an architecture. The radio access technology referred to as 5G New Radio (NR) was introduced in 3GPP Release 15 specifications and is increasingly implemented in base stations. At the same time, an earlier/4G technology radio access technology E-UTRA, commonly referred to as the Long Term Evolution (LTE) can be used by the same base stations. E-UTRA is an acronym for Evolved Universal Mobile Telecommunications System (UMTS) Terrestrial Radio Access, also known as the Evolved Universal Terrestrial Radio Access (E-UTRA) in early drafts of the 3GPP LTE specification. For simplicity, the following refers to the LTE. The expectation is that the LTE based wireless carriers will co-exists with later generation carriers for years to come.

Figure 1:
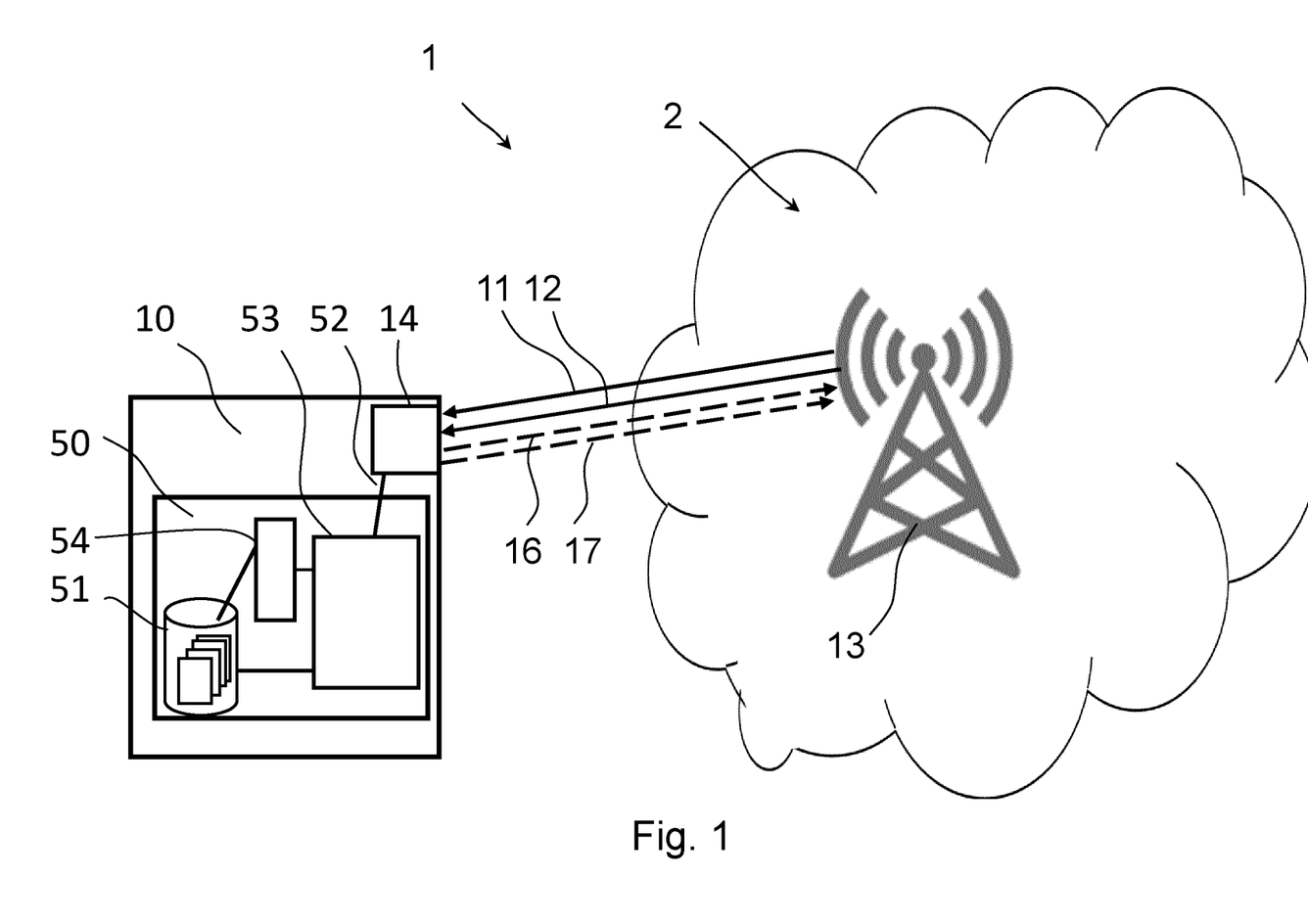
FIG. 1 illustrates an example of a system comprising a base station.

FIG. 1 shows a wireless system 1 comprising a radio access system or radio access network (RAN) 2. A radio access system can comprise one or a plurality of access nodes or base stations 13. A base station may provide one or more cells. Each cell can provide radio beams. The beams can be provided by means of analogue or digital or hybrid beamforming. The base station can comprise, e.g., a 3GPP base station such as gNB (gNodeB), eNB (E-UTRAN Node B/Evolved Node B/eNodeB), and so forth. It is noted that a great number of radio access systems can be provided in a communication system, and that the wider communication system is only shown as cloud 1 and can comprise a number of entities which are not shown for clarity.

A testing device 10 can be located in the service area of the radio access system 2. The testing device 10 can listen to and receive from the base station 13. The testing device 10 can also be configured to transmit to the base station. The communications from the device 10 to the access node/base station 13 is commonly referred to as uplink (UL). The communications from the access node/base station 13 to the device 10 is commonly referred to as downlink (DL). FIG. 1 denotes schematically two downlink carriers by arrows 11 and 12 and two uplink carriers by dashed line arrows 16 and 17.

In operation the base station 13 can serve any suitable device adapted for wireless communications. The served devices may comprise, for example, a user equipment (UE). A wireless communication device may be provided by any device capable of sending and receiving radio signals. Non-limiting examples comprise a mobile station (MS) (e.g., a mobile device such as a mobile phone or what is known as a 'smart phone'), a computer provided with a wireless interface card or other wireless interface facility (e.g., USB dongle), personal data assistant (PDA) or a tablet provided with wireless communication capabilities, machine-type communications (MTC) devices, Internet of Things (IoT) type communications devices, a Cellular Internet of things (CIoT) device or any combinations of these or the like. The device may be provided as part of another device. The device may receive signals over an air or radio interface via appropriate apparatus for receiving and may transmit signals via appropriate apparatus for transmitting radio signals. The communications can occur via multiple paths. To enable MIMO type communications the communicating devices may be provided with multiantenna elements.

This disclosure relates to base station conformance testing by a specifically configured testing device. The device 10 of FIG. 1 denotes a testing device rather than a terminal device used during normal operation. The testing device is configured to perform measurements and relevant computations on the DL transmissions 11 and 12 from the base station (BS) 13. To receive from the base station the testing device is provided with transceiver apparatus 14 configured to receive data transmissions 11 and 12 from the base station 13. The transceiver apparatus 14 can also transmit the data transmissions 16 and 17 to the base station 13.

Figure 2:
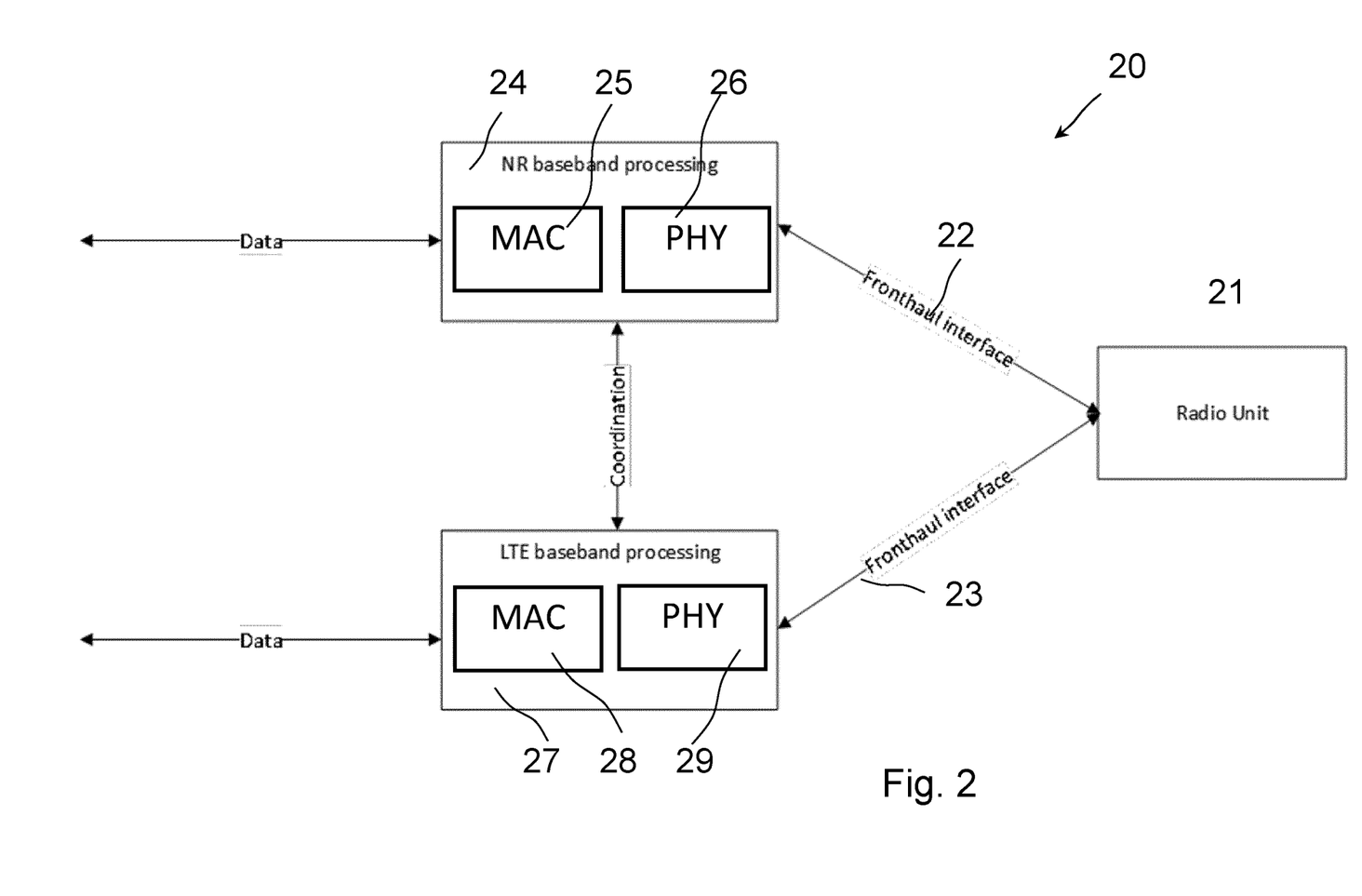
FIG. 2 illustrates an example a multi-standard circuitry.

The two wireless carriers 11 and 12 of FIG. 1 can be generated by separate baseband components at the base station. An example of such baseband arrangement 20 is shown in FIG. 2. A radio unit 21 can provide signal via fronthaul interfaces 22, 23 to respective 4G Long Term Evolution (LTE) and 5G New Radio (NR) baseband processing units 24 and 27. Units 24 and 27 can be provided with appropriate MAC and PHY entities 25, 26, 28 and 29, and the operation thereof coordinated via a coordination interface.

It shall be appreciated that the circuitry of FIG. 2 is only an example of providing multi-standard radio baseband operations. For example, a chipset providing the two basebands in a single unit may also be provided.

The uplink carriers 16 and 17 shown by the dashed arrows relate to configuration stage. These transmissions can be used in the setup of the communication between the testing device 10 and the base station before the actual conformance testing.

The testing device 10 can be provided with appropriate data processing apparatus comprising at least one processor and at least one memory. FIG. 1 shows an example of a data processing apparatus 50 provided in the testing device 10 for performing testing and computation operations. The apparatus comprises processor(s) 53, 54 and memory or memories 51. FIG. 1 shows connections between the elements of the apparatus and an interface 52 for connecting the data processing apparatus 50 to the transceiver apparatus 14 configured to receive signals 11 and 12 from the base station 13. The transceiver apparatus 14 can also be configured to provide necessary measurement data on the received signals 11 and 12 for use on computations by the processor apparatus 50.

The at least one memory may comprise at least one ROM and/or at least one RAM. The device may comprise other possible components for use in software and hardware aided execution of tasks it is designed to perform and implementing the herein described features of the testing device 10. The at least one processor can be coupled to the at least one memory. The at least one processor may be configured to execute an appropriate software code to implement one or more of the following aspects of the testing. The software code may be stored in the at least one memory, for example in the at least one ROM.

FIG. 1 shows schematically two wireless downlink carriers 11 and 12. It is noted that more than two DL carriers are possible. Communications on multiple carriers may also be provided in the uplink.

In accordance with an example reference 11 can denote a 4G Long Term Evolution (LTE) carrier and reference 12 a 5G New Radio (NR) carrier. The frequency bands used by the 5G New Radio (NR) are already used in the 4G LTE. Spectrum sharing capability of the 5G NR, i.e., use of the same spectrum by both systems, enables coexistence between the 4G LTE and 5G NR based systems. The sharing of the spectrum allows network operators a smooth transition from LTE to 5G without the need for an abrupt spectrum re-farming. The re-farming of the spectrum from LTE to NR is instead occurring gradually with the decrease in the number of users/devices of the LTE and the increase in the number of users/devices of the NR. Meanwhile, both LTE and NR systems continue to operate concurrently by the service providers, and effective deployment of NR while maintaining LTE operation is desirable.

Dynamic Spectrum Sharing (DSS) functionality was introduced in 3GPP Release 15 to allow LTE and NR based systems to dynamically share the spectrum. DSS was further developed in later versions of the standard (Rel-16 and Rel-17) to enhance the operation. Introduction and use of DSS may require testing, for example for the reasons such as measuring performance, throughput, interference, impact on the other system, coverage, and network optimization. Network performance measurements can be provided using scanners and devices, for example to estimate coverage and end-to-end (E2E) performance. No base station (BS) DSS testing however has been approved so far and the relevant 3GPP test specifications TS 37.141, TS 38.141-1, and TS 38.141-2 do not define any testing requirements and how the testing should be performed. Thus, the current base station test arrangements do not facilitate combined LTE and NR BS conformance testing with Dynamic Spectrum Sharing (DSS) operation. National regulators (for example FCC in the USA) nevertheless may require testing of multi-standard system base stations with DSS operation.

Figure 3:
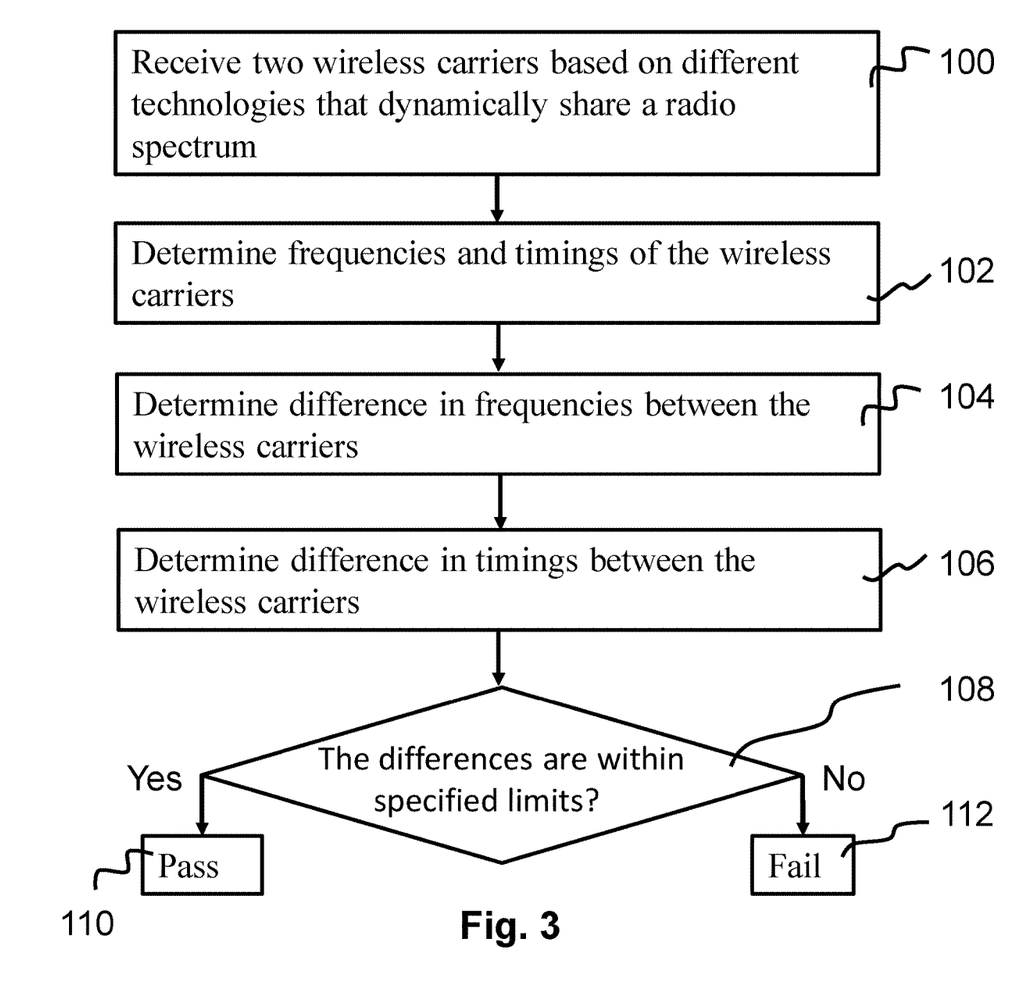
FIG. 3 shows a flowchart according to an example.

An example method for a base station conformance testing is shown in the flowchart of FIG. 3. In the method two wireless carriers transmitted from the base station are received at 100 by a testing device. The wireless carriers are transmitted using at least two different radio technologies dynamically sharing a radio spectrum. Frequencies and timings of the two wireless carriers are determined at 102 based on appropriate measurements. A difference in the frequencies between the two different wireless carriers is determined at 104. A difference in timings between the two wireless carriers is determined at 106. A determining can be made at 108 whether the frequency and timing differences satisfy predefined criteria for acceptable differences in frequency and timing. If yes, the based station has passed the test at 110. If no, the test fails at 112.

A purpose of multi-standard radio conformance testing is to determine whether frequency and timing differences between two wireless carriers are within specified limits. Alignment of the frequencies and timings of the two wireless carriers can be done outside the test itself, taking the results into account. It is then possible to retest the BS after appropriate alignments and other adjustments. The alignment of frequencies and timings of the two wireless carriers can be performed iteratively until the BS passes the test.

The following describes more detailed examples for testing a multi-technology carrier BS with DSS operation.

In accordance with an example a testing arrangement is provided for a base station operating on spectrum shared dynamically among the 5G NR and LTE technologies. The operation can be in accordance with core NR specification from Release 15 to Release 17. The example addresses the conformance testing of multi-technology base stations supporting DSS operation for 5G NR and LTE and proposes test steps for a base station to proof conformance to DSS operation for 5G and LTE.

For LTE and NR BS conformance testing with DSS operation, testing of downlink (DL) frequency and time alignment between the LTE and NR carriers can be provided as a part of the base station tests. The BS transmitter testing may be especially advantageous in ensuring that the BS under test provides satisfactory performance. For example, ensuring DL frequency and time alignment between the LTE and NR carriers can be used to address inter-symbol-interference or inter-carrier-interference between the LTE and NR carriers.

At least one of the differences may be determined during error vector magnitude (EMV) testing. For example, the DL frequency and time alignment can be tested between LTE and NR carriers for BS conformance testing with DSS operation together with error vector magnitude (EVM) tests for the LTE and NR carriers. Integrated determination may be desirable since it may provide more efficient testing operation. If tested together with the EVM requirements a single stage testing may be provided.

Alternatively, the difference determination can be performed separately from the EVM testing. In this type of operation the test setups may need to be repeated for the frequency and timing tests and the EVM test.

Samples of timing of measured DL LTE and NR signals may be obtained in different stages, for example during the EVM tests. According to a more specific example, this can be provided such that carrier frequency errors of the DL LTE and NR carriers are first obtained in the Pre-FFT (Fast Fourier Transform) minimization process of the EVM tests.

as described in 3GPP TS 36.141 Annex F.3.1 for LTE, and 3GPP TS 38.141-1 Annex H.3 and 3GPP TS 38.141-2 Annex L.3 for NR.

A relative carrier frequency error can be calculated as an absolute difference of the measured errors.

Radio scheduling assisted information can be provided for use in the testing.

It may not be a straightforward task to measure the frequency and time alignment between two different signals generated and processed by separate baseband components inside a BS using different LTE and NR test models with different physical channels. To address this a frequency difference introduced by a predefined frequency shift can be used between the LTE and NR transmissions.

The following describes examples for setting up a testing device for testing a multi-technology carrier BS with DSS operation. A frequency shift of a carrier can be used during the setup as explained below. The testing may be provided with UL frequency shift for the NR carrier. For example, 7.5 kHz UL frequency shift for NR carrier may be provided. A reasoning for this is that for LTE the UL 15 kHz subcarrier grid is shifted 7.5 kHz compared to the DL 15 kHz subcarrier grid to avoid having a subcarrier at the direct current (DC) in the LTE uplink. For the NR, however, the 7.5 kHz shift is not used in the UL subcarrier grid, and the NR has other subcarrier spacings, e.g., 30 kHz, 60 kHz, etc. Such misalignment can cause inter-symbol-interference or inter-carrier-interference between the LTE and NR carriers because they are not orthogonal to each other, even if they have the same 15 kHz subcarrier spacing. The 7.5 kHz UL shift can be used to avoid the misalignment between the LTE UL 15 kHz subcarrier grid and NR UL 15 kHz subcarrier.

The 7.5 kHz UL frequency shift can be applied in the NR UL carriers, e.g., carrier 16 in FIG. 1, in the test models or test configurations. These can be used to setup the UL carriers of the BS and test equipment that may be needed, e.g., for various BS receiver testing. It is noted that the UL carriers are not directly used in the measurements itself and by the relevant computations performed by test equipment in this particular test, but in preparation therefore. The actual tests are then performed on the DL transmission from the BS.

The following explains a more detailed example for conformance testing for DL frequency and time alignment between LTE and NR wireless carriers. At least for initial DSS operation with a multi-technology base station (BS), the LTE and NR signals may be generated and processed, e.g., by the separate baseband components of FIG. 2. The testing can be used to test and achieve DL frequency and time alignment between the LTE and NR carriers to avoid inter-symbol-interference or inter-carrier-interference between the LTE and NR carriers to ensure satisfactory base station performance in real-life network deployment. DL frequency and time alignment testing between the LTE and NR carriers for LTE and NR BS operating with DSS operation is not currently defined in any 3GPP test specifications. The DL frequency and time alignment between the LTE and NR carriers for LTE and NR BS conformance testing with DSS operation can be performed together with 3GPP Error Vector Magnitude (EVM) tests for the LTE and NR carriers. The 3GPP Error Vector Magnitude (EVM) tests are specified by the 3GPP in TS 36.141 for LTE and TS 38.141-1/2 for NR as follows.

The carrier frequency errors of the DL LTE and NR carriers can be obtained in the Pre-FFT minimization process of the EVM tests as specified in Annex F.3.1 of TS 36.141 and Annex H.3/L.3 of TS 38.141-1/2, respectively.

The relative carrier frequency error between the DL LTE and NR carriers for LTE&NR BS with DSS operation can thus be calculated as an absolute difference between the carrier frequency errors of the DL LTE and NR carriers:

$$f_e = |f_l - f_n| \tag{1}$$

Where $f_l$ and $f_n$ are the carrier frequency errors of the DL LTE and NR carriers, respectively, and $f_e$ is the relative carrier frequency error between the DL LTE and NR carriers.

For a successful test result the relative carrier frequency error shall not exceed a predefined limit. The limit may be specified as a requirement in a Multi-Standard Radio (MSR) standard, for example 3GPP TS 37.104. Different relative carrier frequency error limits can be specified for different sub-carrier spacings (SCSs). The stricter of the two limits, one for each SCS, can be applied for mixed SCSs between the LTE and NR.

The slot duration is shorter with larger subcarrier spacing. For example, slot duration with 30 kHz subcarrier spacing is half of that with 15 kHz subcarrier spacing. Therefore the relative impact of time and frequency alignment error on performance with larger subcarrier spacing is different to that with smaller subcarrier spacing—larger subcarrier spacing can tolerate a larger frequency alignment error but only a smaller time alignment error.

Figure 4:
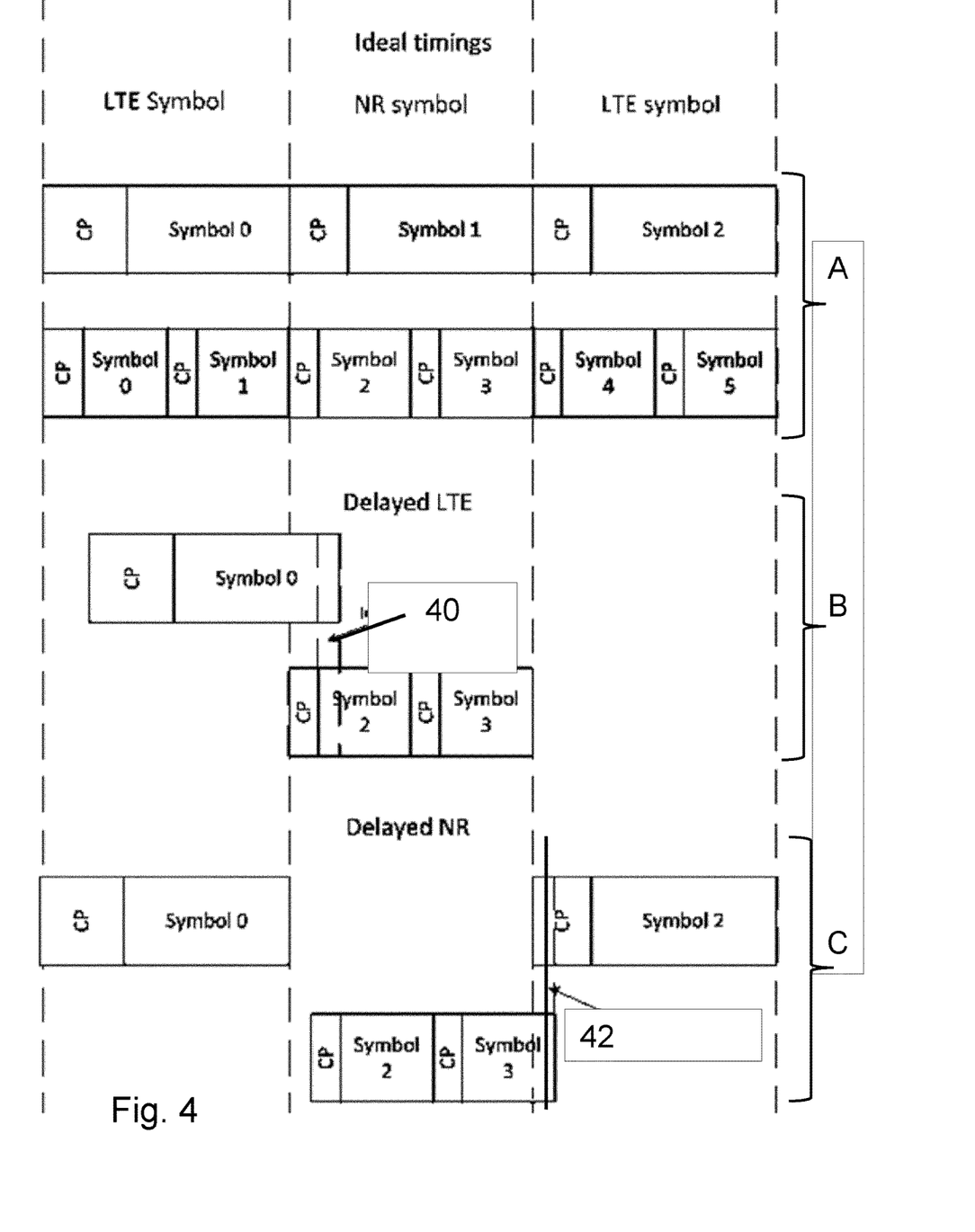
FIG. 4 illustrates examples of timing relationship scenarios for two different carriers.

This is visualised by FIG. 4 showing three examples for timing alignment depending on subcarrier spacing (SCS). It is noted that in each example cyclic prefix (CP) and symbol lengths are not in scale and first cyclic prefix is longer than the next ones. The relations of symbol lengths between the LTE and NR technologies are presented in scale.

Example A show ideal timings, i.e., where the symbols are timewise in alignment.

In example B the LTE signal is delayed by a time that is shorter than the cyclic prefix (CP). This causes an interference for subsequent NR symbol as the delay cannot be compensated by the NR cyclic prefix. This interference region is denoted by reference 40.

In example C the NR signal is delayed by a time shorter that its cyclic prefix (CP). In this case the interference for the LTE signal can be compensated by the longer cyclic prefix, as illustrated by line 42.

In this example the sample timing of the measured DL LTE and NR signals can be obtained in the Pre-FFT minimization process of the EVM tests which are specified in Annex F.3.1 of 3GPP TS 36.141 and Annex H.3/L.3 of 3GPP TS 38.141-1/2, respectively. The time alignment error between the DL LTE and NR carriers for LTE and NR BS with DSS operation can be calculated as the absolute difference between the sample timing of the measured DL LTE and NR signals:

$$t_e = |t_l - t_n| \tag{2}$$

Where $t_l$ and $t_n$ are the sample timing of the measured DL LTE and NR signals, respectively, and $t_e$ is the time alignment error between the DL LTE and NR carriers.

For a successful test the time alignment error shall not exceed a predefined limit.

Different relative carrier timing error limits can be specified for different SCSs. The tighter among the two limits (one for each SCS) can be applied for mixed SCSs between LTE and NR.

The testing device may communicate the test results to an appropriate network entity. The network entity may cause adaptive adjustment of the base station based on the results.

A network entity controlling the adjustment may be provided at the base station or as a separate control entity. Results of the testing by the testing device can cause adaptive adjustment of frequency and/or timing of at least one of the wireless carriers based on the testing. The adjustment system can be arranged as an automatic loop such that rounds of testing and adjustments in response to the testing are performed until the base station operates within predefined limits without operator intervention.

It is noted that while the above describes example embodiments, there are several variations and modifications which may be made to the disclosed solution without departing from the scope of the present invention. Different features from different embodiments may be combined.

The embodiments and means for implementing the described functions and features may vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. The hardware and/or the software can provide the necessary means for implementing the various examples.

It is noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. Alternatively or additionally some embodiments may be implemented using circuitry. The circuitry may be configured to perform one or more of the functions and/or method procedures previously described. That circuitry may be provided in the network entity and/or in the communications device and/or a server and/or a device.

As used in this application, the term "circuitry" may refer to one or more or all of the following:
(a) hardware-only circuit implementations (such as implementations in only analogue and/or digital circuitry);
(b) combinations of hardware circuits and software, such as: (i) a combination of analogue and/or digital hardware circuit(s) with software/firmware and (ii) any portions of hardware processor(s) with software (including digital signal processor(s)), software, and memory(ies) that work together to cause the communications device and/or device and/or server and/or network entity to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

It is noted that whilst embodiments have been described in relation to certain architectures, similar principles can be applied to other systems. Therefore, although certain embodiments were described above by way of example with reference to certain exemplifying architectures for wireless networks, technologies standards, and protocols, the herein described features may be applied to any other suitable forms of systems, architectures and devices than those illustrated and described in detail in the above examples. It is also noted that different combinations of different embodiments are possible. It is also noted herein that while the above describes exemplifying embodiments, there are several variations and modifications which may be made to the disclosed solution without departing from the spirit and scope of the present invention.

The invention claimed is:

1. A method for base station conformance testing, comprising:
   receiving from the base station two wireless carriers that are based on different radio technologies and dynamically share a radio spectrum,
   measuring frequencies and timings of the two wireless carriers,
   determining a frequency difference between the measured frequencies of the two wireless carriers,
   determining a timing difference between the measured timings of the two wireless carriers, and
   determining whether the frequency and timing differences satisfy predefined criteria for acceptable frequency and timing differences.

2. The method of claim 1, comprising determining the difference in the frequencies and/or the difference in the timings between the two wireless carriers during error vector magnitude testing.

3. The method of claim 2, wherein the difference in the frequencies and/or the difference in the timings is obtained in a Pre-FFT minimization process of the error vector magnitude testing.

4. The method of claim 1, comprising testing wireless carriers according to 3GPP 5G New Radio and 3GPP 4G Long Term Evolution standards.

5. The method of claim 1, comprising computing a relative carrier frequency error and a relative carrier timing error between the two wireless carriers of different carrier technologies.

6. The method of claim 5, wherein different relative carrier frequency and timing error limits are used for different sub-carrier spacings, the method comprising applying the strictest of the limits to mixed sub-carrier spacings between the two wireless carriers of different carrier technologies.

7. The method of claim 5, comprising computing absolute differences between the carrier frequency errors and carrier timing errors of the two wireless carriers.

8. The method of claim 1, further comprising setting up communications between a testing device and the base station for the conformance testing, the setting up comprising applying a frequency shift to a wireless carrier generated by the testing device and using the frequency shifted wireless carrier for the setup.

9. An apparatus for a testing device for base station conformance testing, comprising at least one processor and at least one memory including a computer program code, the at least one memory and computer program code configured to, with the at least one processor, cause the apparatus to perform at least:
   determining frequency and timing differences between measured frequencies and timings of two wireless carriers received from the base station based on different radio technologies and dynamically sharing a radio spectrum, and
   determining whether the frequency and timing differences satisfy predefined criteria for acceptable frequency and timing differences.

10. The apparatus of claim 9, configured to determine the difference in the frequencies and/or the difference in the timings between the two wireless carriers during error vector magnitude testing.

11. The apparatus of claim 10, configured to determine the difference in the frequencies and/or the difference in the timings in a Pre-FFT minimization process of the error vector magnitude testing.

12. The apparatus of claim 9, configured to test wireless carriers according to 3GPP 5G New Radio and 3GPP 4G Long Term Evolution standards.

13. The apparatus of claim 9, configured to compute a relative carrier frequency error and a relative carrier timing error between the two wireless carriers of different carrier technologies.

14. The apparatus of claim 13, wherein different relative carrier frequency and timing error limits are used for different sub-carrier spacings, and the strictest limits are applied to mixed sub-carrier spacings between the two wireless carriers of different carrier technologies.

15. The apparatus of claim 13, configured to compute absolute differences between the carrier frequency errors and carrier timing errors of the two wireless carriers.

16. The apparatus of claim 9, further configured to set up communications between the testing device and the base station for the conformance testing, the setting up comprising applying a frequency shift to a wireless carrier generated by the testing device and using the frequency shifted wireless carrier for the setup.

17. The apparatus of claim 16, configured to applying a 7.5 kHz frequency shift to the wireless carrier.

18. The apparatus of claim 16, configured to apply the frequency shift to a 3GPP 5G New Radio uplink carrier.

19. The apparatus of claim 9, further configured to cause adjustment of frequency and/or timing of at least one of the wireless carriers based on the testing.

20. The apparatus of claim 19, configured to provide an adjustment loop with the base station such that the frequency and/or timing of at least one of the wireless carriers is automatically adjusted based on results of the testing.

\* \* \* \* \*